UNITED STATES PATENT OFFICE.

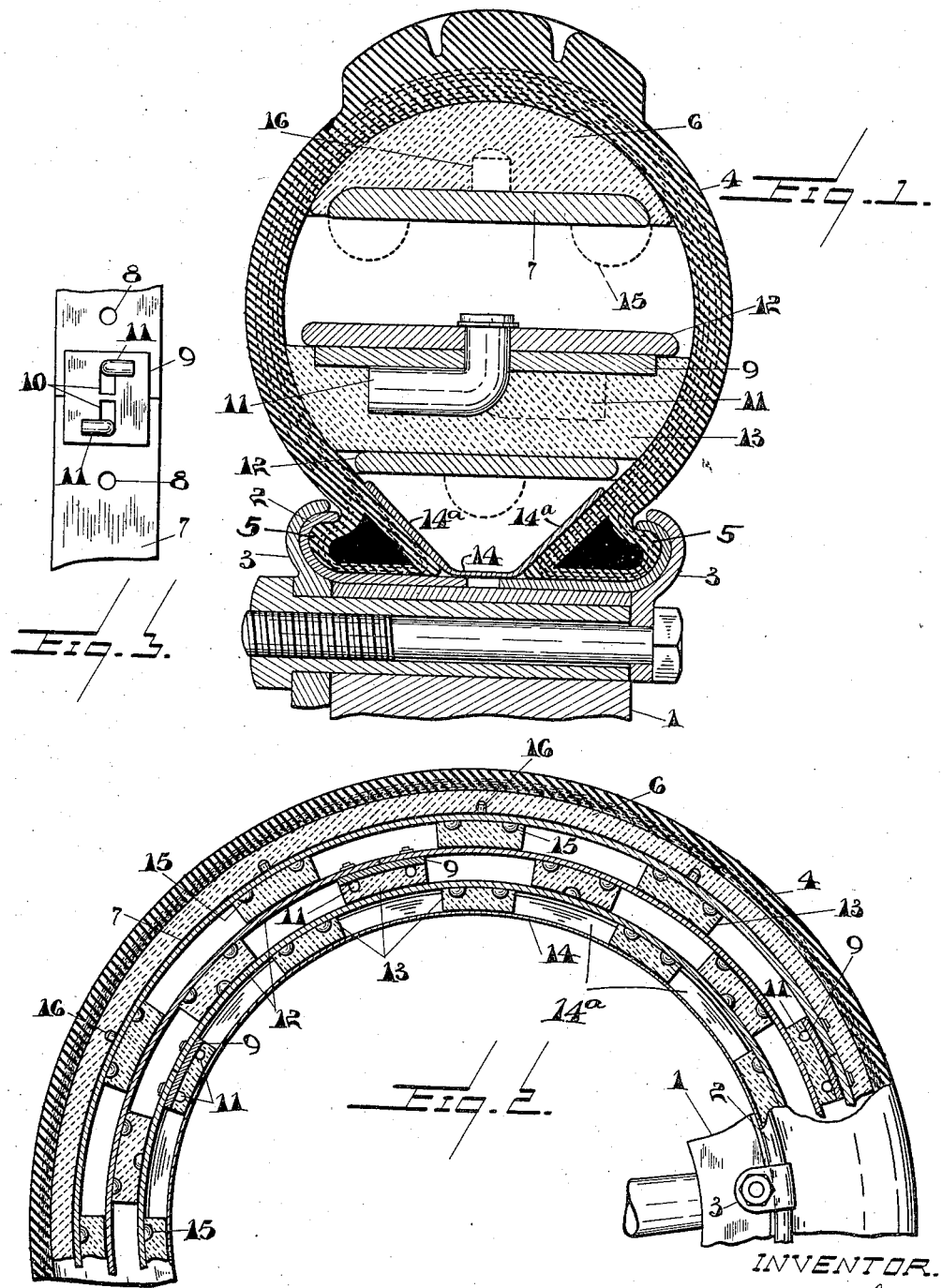

ELI J. TAYLOR, OF EDMONTON, ALBERTA, CANADA.

VEHICLE-TIRE.

1,310,513.   Specification of Letters Patent.   Patented July 22, 1919.

Application filed April 18, 1918. Serial No. 229,288.

*To all whom it may concern:*

Be it known that I, ELI J. TAYLOR, of the city of Edmonton, in the Province of Alberta, Canada, have invented certain new and useful Improvements in Vehicle-Tires, of which the following is a specification.

This invention relates to tires intended to possess the resiliency of pneumatic tires without their concomitant disadvantages, and my object is to devise a tire which externally does not differ essentially from a pneumatic tire and which can be readily applied to any wheel provided with a laterally adjustable removable side flange.

I attain my object by means of the constructions hereinafter described and illustrated in the accompanying drawings in which—

Figure 1 is a cross section, full size, of a tire constructed in accordance with my invention;

Fig. 2 is a longitudinal section on a smaller scale, partly shown in full elevation with the tire in position on a rim; and Fig. 3 a plan view of the underside of one of the resilient metal bands used in the tire showing the means for connecting the ends of the same.

In the drawings like numerals of reference indicate corresponding parts in the different figures.

1 is the felly of a wheel, which is preferably provided with a divided flanged rim 2, the parts of which are adapted to be drawn together and held in place on the felly by means of the clamps 3.

4 is a tire cover, which may be of any ordinary type, and is preferably provided with clencher edges 5 adapted for engagement by the flanges of the rim 2.

Within the cover is fitted an elastic filler adapted to take the place of a pneumatic inner tube. This filler is built up and inserted in the cover substantially as follows: 6 is an annular rubber cushion, which is fitted in the cover adjacent the tread. The base of this cushion is supported on a resilient band 7. As the beaded edges 5 of the tire are substantially inextensible, this band must be divided to enable it to be inserted within the cover.

As it is of the utmost importance that the filler should fit very tightly within the cover, and, if possible, exert an outward pressure substantially as does an air-filled inner tube, I prefer to make the resilient band of such a length that when first inserted its ends overlap and it is therefore necessary to apply a tool to it to spread the ends apart and thus compress the elastic cushion. Holes 8 are shown adjacent the ends of this band for engagement by the ends of a suitable tool. To hold the ends in position after the band has been expanded, I provide a plate 9 having slots 10 formed therein through which may pass the pivoted hooks 11 connected with the band. After the hooks have passed through the slots in the plate, they are turned as shown in Fig. 3, thus securely holding the ends of the band in position.

Between the resilient band 7 and the rim is located a resilient cellular structure adapted to fill the cover and to bear against the band aforesaid when the device is in place on a wheel. This resilient cellular structure comprises one or more resilient bands 12, each divided to facilitate its insertion in the cover and each provided with fastening means similar to the fastening means provided for the band 7, and a series of blocks 13, preferably of resilient material such as rubber.

The blocks 13 are spaced from one another, the blocks being in staggered relationship to one another in the different rows. The outer blocks engage the resilient band 7, while the inner blocks are suitably shaped to fit between the edges of the tire. It is important that the edges of the tire at all points shall have a stiff support against which they may be clamped by the drawing together of the parts of the flanged rim 2. I therefore provide an annular divided band 14 having outwardly inclined lateral walls 14$^a$, 14$^a$, and it is the inner surface of this band which is directly engaged by the inner series of blocks 13.

It will be seen that the blocks 13, 13 which are contiguous to the plates 9, 9 are recessed to accommodate the pivoted hooks 11, 11 when in their locking position, so that the said recessed blocks when in position prevent the accidental unlocking of the said hooks.

It is preferable that the bands 12 be so proportioned that when expanded into place they exert an outward pressure radially of the wheel to which the tire is connected, and that the blocks extend laterally over said bands to exert a lateral pressure on the cover 4. By this arrangement I insure the elastic filler as a whole being pressed out firmly into contact with the inner surface of the cover at the tread portion thereof. By suitably tightening the clamps 3, the clencher edges are drawn against the wedge shaped sides of the band 14, tending to lift the same and thus further contribute to the close fit of the filler in the tire. At the same time, the lateral movement of the edges of the cover draws the side walls of the cover closely and tightly against the sides of the elastic filler and the tendency of the resilient blocks to expand laterally increases their effectiveness. In the event of any slackness developing owing to the stretching of the cover after the tire has been in use for some time, any suitable liners may be employed to take up the slack, such, for example, as the liners commonly employed between inner tubes and tire covers.

The blocks 13 are not fastened in any way to the adjacent bands and to prevent creeping and to hold the blocks against displacement, I provide each band with a series of projections 15, which may be rivets with rounded heads, and which fit correspondingly shaped holes in the rubber blocks.

To prevent displacement of the rubber cushion 6 relative to the band 7 I provide the latter with a series of studs 16 which project into holes formed in the cushion substantially along the median plane of the tire.

From the above description it will be seen that I have devised a tire which need not differ externally in appearance from an ordinary pneumatic tire and in the construction of which ordinary tire covers and detachable rims may be employed. It will further be seen that by the combination of the resilient blocks and resilient bands that the tire as a whole may be made to possess substantially the resiliency of the ordinary pneumatic tire without the attendant disadvantage of the liability of the pneumatic tire to punctures and blow-outs. It will further be seen that owing to the method of the building up of the tire it will possess substantially the same resistance to side pressure as the ordinary pneumatic tire.

What I claim as my invention is:—

1. In a device of the class described, in combination, a resilient tubular tire cover, an elastic filler fitting within the tread portion of said tire cover, a divided resilient band of somewhat greater length than the normal internal circumference of said filler, whereby upon the ends of said band abutting outward radial pressure is exerted on said filler, means for locking the ends of said band in abutment, and a resilient cellular structure to fill the body of said tire cover and exert radial pressure on said band, and lateral pressure on the walls of said tire cover when the device is applied to a wheel.

2. In a device of the class described, in combination, a resilient tubular tire cover, an elastic filler fitting within the tread portion of said tire cover, a resilient band positioned against the inner surface of said filler to exert a radial pressure thereagainst, resilient bands concentric with said first mentioned band, and resilient spacing blocks between adjacent bands, said bands being slightly movable radially and circumferentially of said tire cover against the resilient action of said blocks.

3. In a device of the class described, in combination, a resilient tubular tire cover, an elastic filler fitting within the tread portion of said tire cover, a resilient band positioned against the inner surface of said filler to exert a radial pressure thereagainst, resilient bands concentric with said first mentioned band, resilient spacing blocks solely supporting said bands, and means on said bands locking said blocks against displacement lengthwise and laterally of said bands.

4. In a device of the class described, in combination, a resilient tubular tire cover, an elastic filler fitting within the tread portion of said cover, a cellular filler for the body of said cover, said cellular filler comprising a plurality of concentric resilient bands, of varying diameters, and resilient spacing blocks between adjacent bands, the lateral surfaces of said blocks shaped to conform with the shape of the inner walls of the body of said tire cover, and means to effect perpendicular compression of said resilient blocks between said bands, whereby said blocks will tend to expand laterally against the walls of the body of said tire cover.

5. In a device of the class described, a cellular filler for a tubular tire cover, comprising divided resilient concentric bands, locking means for securing the divided parts of said bands against separation, said locking means adapted to manual adjustment to effect their unlocking, and resilient spacing blocks between said bands, certain of said blocks being contiguous to said locking means and securing said means against accidental unlocking.

Signed at Detroit, Wayne county, Michigan, this 1st day of April, 1918.

ELI J. TAYLOR.

Witnesses:
FREDERICK S. BAKER,
CATHERINE E. CORCORAN.